United States Patent
Doyle et al.

[15] 3,692,334
[45] Sept. 19, 1972

[54] COMBUSTION LINER ASSEMBLY

[72] Inventors: Brian W. Doyle, Shelton; Joseph Rygelis, Monroe; Ervin J. Sweet, Trumbull, all of Conn.

[73] Assignee: Avco Corporation, Stratford, Conn.

[22] Filed: Jan. 28, 1971

[21] Appl. No.: 110,447

[52] U.S. Cl. .................... 285/41, 285/187, 285/305
[51] Int. Cl. .......................... F16l 37/14, F16l 53/00
[58] Field of Search....285/13, 14, 41, 153, 154, 187, 285/305, 321

[56] References Cited

UNITED STATES PATENTS

| | | | |
|---|---|---|---|
| 2,337,038 | 12/1943 | Fentress | ...................... 285/41 |
| 2,310,490 | 2/1943 | Melsom | ................. 285/305 X |
| 2,509,503 | 5/1950 | Huyton | ................... 285/187 X |
| 1,967,297 | 7/1934 | Down | ........................... 285/14 |
| 2,108,265 | 2/1938 | Martin et al. | ......... 285/305 X |
| 2,494,659 | 1/1950 | Huyton | ........................ 285/41 |

Primary Examiner—David J. Williamowsky
Assistant Examiner—David H. Corbin
Attorney—Charles M. Hogan and Irwin P. Garfinkle

[57] ABSTRACT

A combustion chamber liner is comprised of two telescoping sections, the leading edge of the downstream section overlapping the trailing edge of the upstream section. The end of the downstream section is provided with a plurality of peripherally spaced inwardly directed bosses. The inner peripheral surface of each of the bosses is grooved to accept a metal ring. The end of the upstream section is provided with a peripherally stepped surface having a groove which in the assembled position of the liner is opposed to the groove in the spaced bosses. The two telescoping sections are joined by threading a wire locking ring into the grooves through a tangential opening. The wire ring serves to prevent movement between the sections. When cool, the dimensions of the upstream and downstream sections are such that there is a loose connection between the sections. However, the upstream section is subjected to more heat than the downstream section, causing it to expand to provide a tight fit 4 Claims, 2 Drawing Figures

PATENTED SEP 19 1972　　3,692,334

INVENTORS.
BRIAN W. DOYLE
JOSEPH RYGELIS
ERVIN J. SWEET
BY
ATTORNEYS.

COMBUSTION LINER ASSEMBLY

BACKGROUND OF THE INVENTION

The combustor for the conventional gas turbine engine is often made of telescoped generally cylindrical combustor sections. A common method for manufacturing these combustors is to telescope a number of sections and spotweld them together at circumferentially spaced points along their overlapping edges. The assembly of such telescoping sections is often difficult and frequently requires complex joints for providing a firm construction while at the same time admitting cooling air. Moreover, the telescoping sections are subjected to different temperatures, and hence the stresses introduced by relative expansion of the sections can cause fatigue leading to premature failure of the metals.

This invention provides a simple and efficient means for supporting the telescoping sections of the combustor while at the same time permitting expansion of the combustor sections. Briefly stated, the overlapping sections of the combustor are interconnected by means of a wire locking ring seated between opposing grooves in the overlapped sections. The wire locking ring is seated by threading into the grooves through a tangential opening. The grooves in one of the sections are located in peripherally spaced bosses, the spacing between the bosses providing for the admission of coolant air into the combustor chamber. The dimensions of the overlapping sections are chosen so that the fit between the sections is loose when cool. When heated, the upstream section is subjected to greater heat and its expansion with respect to the downstream section produces a rigid fit without introducing stresses sufficient to cause fatigue in the metals.

THE DRAWINGS

FIG. 1 is an axial cross section of a combustor liner assembled in accordance with this invention; and FIG. 2 is a section taken through the line 2—2 in FIG. 1.

DESCRIPTION OF THE ILLUSTRATED EMBODIMENT

Figure 1:
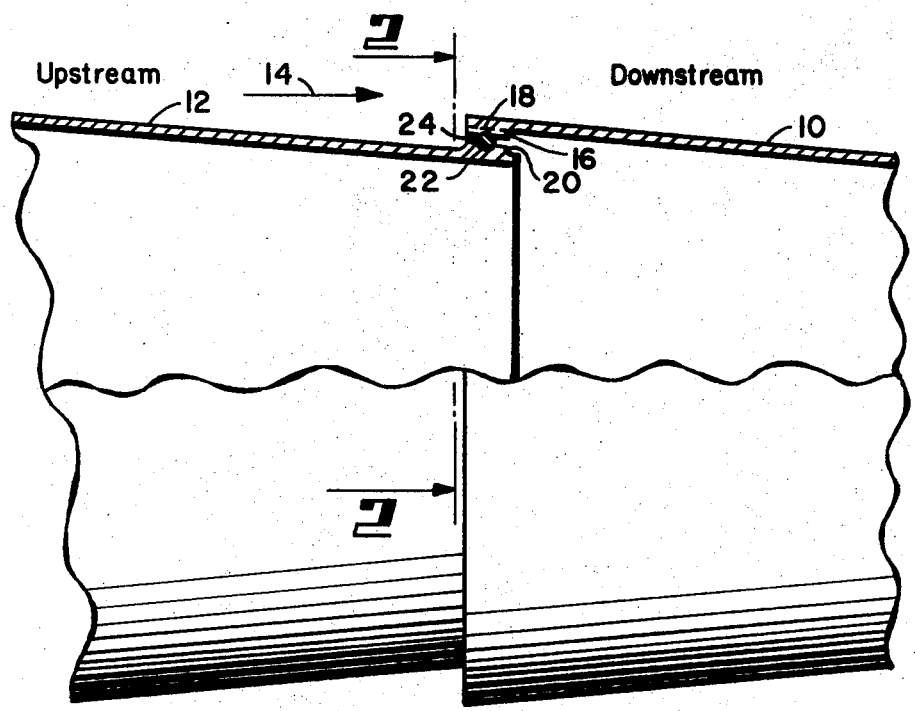

FIG. 1 shown two telescoped sections 10 and 12 of a combustor suitable for use in a gas turbine engine. While only two sections are shown, it will be understood that the combustor may comprise several additional sections and that the sections may, in practice, have other configurations; that is to say, the walls may have more complex shapes, may include perforations for the admission of cooling air, and may be grooved in the direction of gas flow.

Compressed air is delivered to the combustor from a compressor (not shown) in the direction of the arrow 14. The leading edge of the downstream outer section 10 is provided with a plurality of peripherally spaced bosses 16, all of which have peripherally aligned grooves 18. Cooling air is admitted to the combustor through the spaces between the bosses 16.

Figure 2:
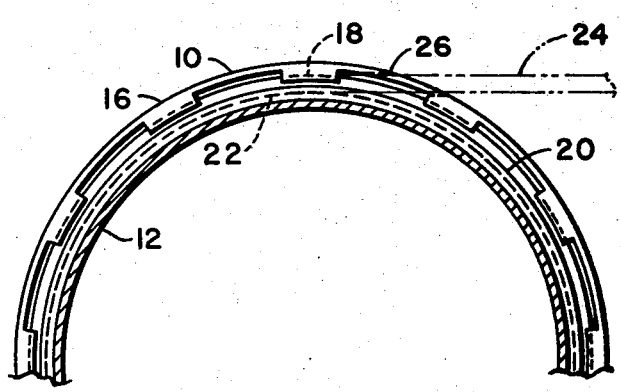

The trailing edge of the inner upstream section 12 is provided with a step 20 having a groove 22 positioned opposite the groove 18. A wire locking ring 24, having a cross section which is generally complementary to the composite groove formed by the grooves 18 and 22, is seated therein to lock the sections together. As seen in FIG. 2, the wire locking ring 24 is seated by threading it through a tangential opening 26 in the section 10. If necessary, this opening may be plugged.

The dimensions of the locking ring 24, bosses 16, and the step 20 and their associated grooves are selected so that there is a loose fit between the sections in a cold condition. Because of the direction of flow of the cooling air, the upstream section 12 is subjected to more heat than the downstream section 10, and therefore, the upstream section expands more than the downstream section. If the dimensions have been properly selected, a tight fit results when fully heated to operating temperature. While the illustrated embodiment is constructed so that the bosses 16 are located on the downstream section 10, the bosses may under some conditions be located on the other section, or on both sections. In either case, the area of the combustor between the overlapping sections and immediately downstream of the bosses provides an expansion area for the compressed air. This tends to improve the performance of the combustor and is one of the advantages of the invention.

CONCLUSION

In summary, applicants have devised a joint which is simple in construction and assembly for securing the overlapping telescoped sections of a combustion chamber. In operation the joint is rigid, it produces no excessive stresses on the metals, and at the same time it permits the in-flow of cooling air to the combustion chamber.

We claim:

1. A combustor having upstream and downstream radially spaced telescoping sections, an end of said downstream section overlapping an end of said upstream section, the outer surface of the end of the upstream section being surrounded by the inner surface of the end of the downstream section;

a plurality of peripherally spaced bosses on one of said surfaces, the spacing between said bosses providing means for admitting cooling air from outside the combustor to the inside thereof, the direction of flow of the cooling air being toward the downstream section such that the upstream section is subjected to more heat than the downstream section whereby the upstream section expands more than the downstream section;

a first groove in each of said bosses, said first grooves being peripherally aligned;

a step on said other surface, said step having a second groove opposed to said first grooves;

a tangential opening through said downstream section to said first grooves;

and a wire locking ring threaded through said opening and seated in said first and second grooves for connecting said sections, said bosses and said step being dimensioned such that the fit between said sections is loose when said sections are in a cool non-operating condition, said fit becoming tight under normal hot operating conditions due to the difference in expansion of said sections.

2. The invention as defined in claim 1 wherein said locking ring is dimensioned to fit loosely in said grooves without sufficient clearance to permit separation of the sections under normal cool non-operating conditions, said locking ring fit becoming tight under said normal hot operating conditions.

3. The invention as defined in claim 1 wherein said bosses are on said outer surface and said step is on said inner surface.

4. The invention as defined in claim 1 wherein said telescoping sections form an expansion area immediately downstream of said bosses.

* * * * *